United States Patent
Wadsworth

(10) Patent No.: US 9,676,148 B2
(45) Date of Patent: Jun. 13, 2017

(54) SYSTEM AND METHOD FOR MANUFACTURING AND TESTING COMPOSITE ACOUSTIC PANELS

(71) Applicant: Spirit AeroSystems, Inc., Wichita, KS (US)

(72) Inventor: Mark Anthony Wadsworth, Sedan, KS (US)

(73) Assignee: Spirit AeroSystems, Inc., Wichita, KS (US)

(*) Notice: Subject to any disclaimer, the term of this patent is extended or adjusted under 35 U.S.C. 154(b) by 144 days.

(21) Appl. No.: 14/451,028

(22) Filed: Aug. 4, 2014

(65) Prior Publication Data

US 2016/0031163 A1  Feb. 4, 2016

(51) Int. Cl.
| | |
|---|---|
| *B32B 41/00* | (2006.01) |
| *B29C 70/34* | (2006.01) |
| *B29C 70/54* | (2006.01) |
| *B29D 24/00* | (2006.01) |
| *F02C 7/045* | (2006.01) |
| *G10K 11/168* | (2006.01) |
| *F02K 1/82* | (2006.01) |
| *B29L 31/30* | (2006.01) |

(52) U.S. Cl.
CPC ............ *B29C 70/34* (2013.01); *B29C 70/342* (2013.01); *B29C 70/54* (2013.01); *B29D 24/005* (2013.01); *F02C 7/045* (2013.01); *F02K 1/827* (2013.01); *G10K 11/168* (2013.01); *B29L 2031/3076* (2013.01); *F05D 2230/50* (2013.01); *F05D 2250/283* (2013.01); *F05D 2260/96* (2013.01); *Y02T 50/672* (2013.01)

(58) Field of Classification Search
CPC ......... B29C 70/34; B29C 70/54; B29C 65/48; B29L 2031/3076
USPC .......... 156/60, 64, 73.1, 163, 196, 212, 242, 156/245, 253, 294, 308.2, 378
See application file for complete search history.

(56) References Cited

U.S. PATENT DOCUMENTS

| | | | |
|---|---|---|---|
| 2010/0080980 A1* | 4/2010 | Maheshwari | B29C 70/086 428/320.2 |
| 2010/0163167 A1* | 7/2010 | Maheshwari | B29C 70/545 156/245 |
| 2014/0141234 A1* | 5/2014 | Rogalski | B32B 3/18 428/321.5 |

* cited by examiner

*Primary Examiner* — Michael N Orlando
*Assistant Examiner* — Joshel Rivera
(74) *Attorney, Agent, or Firm* — Hovey Williams LLP

(57) ABSTRACT

A system and method for temporarily sealing holes in a perforated material layer of a composite acoustic panel so as to reduce potential migration of a release agent through the holes during a curing process and to reduce ingression of water through the holes during a subsequent testing process. The release agent is applied to a tool, the barrier layer is arranged over the release agent, and a lay-up of elements, beginning with the perforated layer, are arranged over the barrier layer prior to heating the lay-up to form the panel. The barrier layer may be a substantially solid film, such as a plastic or nylon film, having a width of at least approximately twelve inches and a low vapor permeability with regard to the release agent. After the testing process is complete, the barrier layer may be peeled from the panel.

20 Claims, 4 Drawing Sheets

SYSTEM AND METHOD FOR MANUFACTURING AND TESTING COMPOSITE ACOUSTIC PANELS

FIELD

The present invention relates to systems and methods for manufacturing and testing composite acoustic panels.

BACKGROUND

Airplane engines can create substantial noise pollution. One way of attenuating this noise is to provide engine nacelles with noise-absorbing composite acoustic panels. Such a panel typically comprises one or more noise-trapping cellular core layers (sometimes referred to as "honeycomb") covered on a first side by a perforated air-permeable skin ("perf skin"), and on an opposite second side by an air-impermeable skin ("back skin") The panel is typically assembled by arranging the various core layers and skins on a tool, applying an adhesive, and processing the assembly under a vacuum bag in an oven or autoclave so as to compress the layers and skins together, polymerize the adhesive, and create a single composite structure. However, during the curing process a release agent applied to the tool may potentially migrate, especially if it is partially vaporized by the heat and vacuum used to cure the adhesive, through the holes in the perforated skin and into the panel.

Additionally, composite acoustic panels are often tested by ultrasonic inspection prior to use. Typically, a Through Transmission Ultrasonic (TTU) sender and a TTU receiver are mounted on opposite sides of a panel. The TTU sender and receiver both include water columns that extend to the surfaces of the panel. The TTU sender sends a signal that propagates through its water column, through the panel, and through the TTU receiver's water column to the TTU receiver, and variations in the signal received by the TTU receiver indicate potential flaws in the panel. While the water columns are in contact with the surfaces of the panel, water can migrate through the holes in the perforated skin and into the panel. Water that makes its way into the interior of the panel must be removed before subsequent processing, which may be time-consuming and expensive. Furthermore, water within the panel may fill voids, thus masking defects and making the TTU testing process less effective.

One solution to the problem of water ingression is to apply pressure-sensitive adhesive tape over the holes in the perforated skin immediately prior to TTU testing. More specifically, a technician removes relatively narrow strips of adhesive tape from a roll and places them over the holes with an overlapping pattern. However, this makes inefficient use of the relatively expensive adhesive tape and can cause repetitive motion injuries. Removing the adhesive tape can cause similar injuries due to the high forces necessary to peel the adhesive from the panel. In addition, the perforated skin is sometimes contaminated by the adhesive and must be cleaned with a solvent. Furthermore, the application of adhesive tape does not address the problem of release agent migration. Adhesive tape is applied only to completed panels that have already been assembled (i.e., after any potential release agent migration has occurred).

This background discussion is intended to provide information related to the present invention which is not necessarily prior art.

SUMMARY

Embodiments of the present invention solve the above-described and other problems and limitations by providing a system and method for temporarily sealing the holes in a perforated material layer of a composite acoustic panel so as to reduce or substantially eliminate potential migration of a release agent through the holes and into the panel during a curing process and so as to reduce or substantially eliminate ingression of water through the holes and into the panel during a subsequent testing process.

In one embodiment, the method of forming a composite structure on a tool having a surface and then testing the composite structure may broadly comprise the steps of arranging a barrier layer over the surface of the tool and then creating a lay-up of elements. The step of creating a lay-up of elements may include arranging a perforated material layer over the barrier layer, wherein the perforated material layer presents a plurality of holes; applying an adhesive to at least one of the perforated material layer or a cellular core layer; and arranging the cellular core material layer over the perforated material layer such that the adhesive is interposed between the perforated layer and the cellular core layer. The lay-up of elements may be heated to cure the adhesive and form the composite structure; the composite structure may be removed from the tool, a test may be performed on the composite structure; and the barrier layer may be removed after the test of the composite structure is complete.

In various implementations of this embodiment, the method of forming a composite acoustic panel may further include any one or more of the following additional features. The barrier layer may be applied as a substantially solid film, such as a nylon film, which may have a width of at least approximately 12 inches. The perforated material layer may be partially cured before being added to the lay-up. No adhesive may be used between the barrier layer and the perforated material layer. A release agent may be apply to the surface of the tool prior to arranging the barrier layer, and the barrier layer may have a low vapor permeability with regard to the release agent. The method may further include the steps of applying the adhesive to at least one of the cellular core material or a third material layer, and arranging the third material layer over the cellular core material layer such that the adhesive is interposed between the third material layer and the cellular core material layer. The method as set forth in claim 1, wherein the test may be a through transmission ultrasonic test in which water is in contact with the barrier layer. The method may further include the steps of arranging a vacuum bag over the lay-up of elements, and applying a vacuum to the vacuum bag during heating so as to compress the lay-up of elements.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
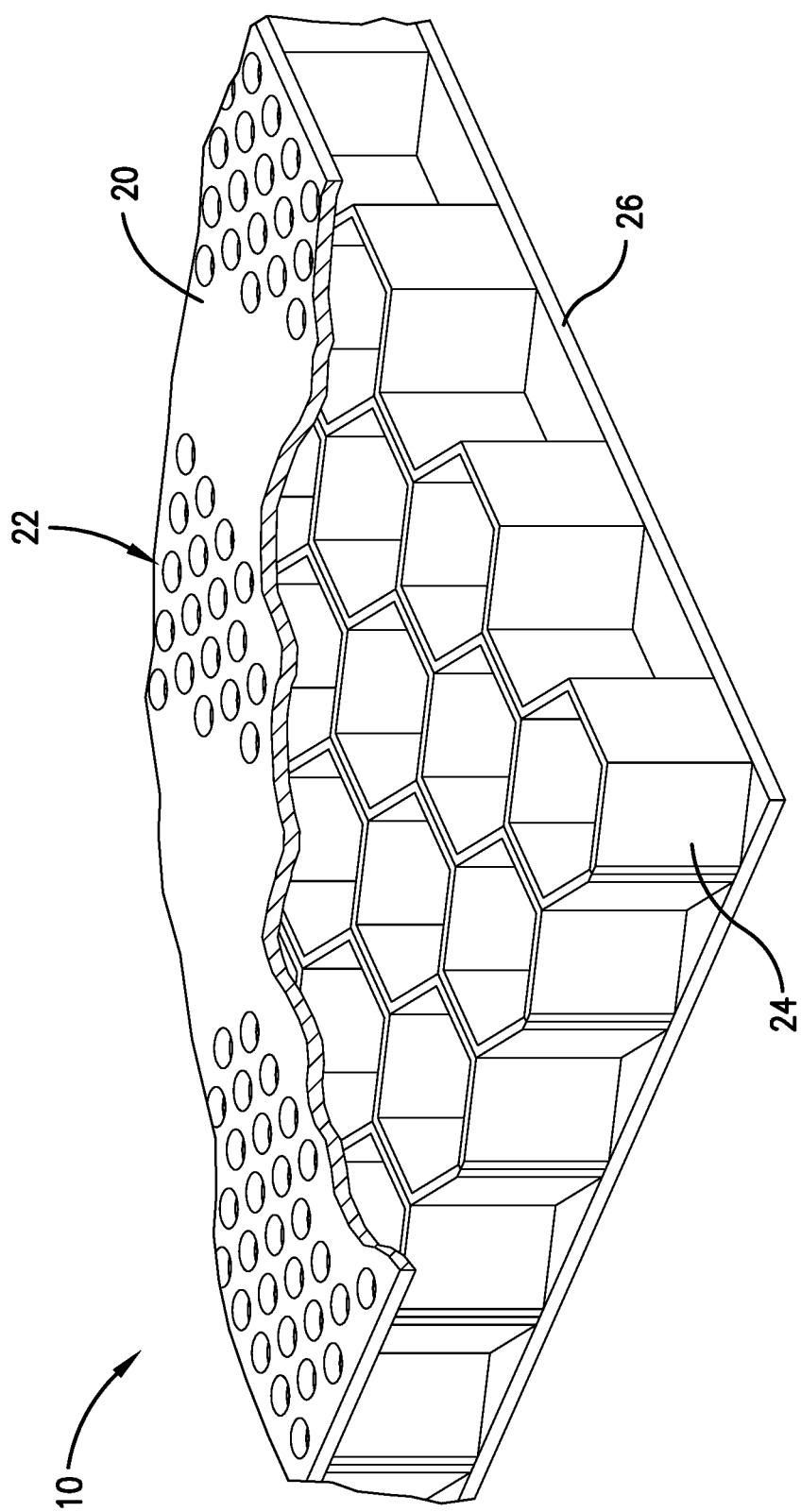
FIG. 1 is a isometric view of a composite acoustic panel constructed in accordance with an embodiment of the present invention.

Broadly characterized, the present invention provides a system and method for temporarily sealing the holes in a perforated material layer of a composite acoustic panel so as to reduce or substantially eliminate potential migration of a release agent through the holes and into the panel during a curing process and so as to reduce or substantially eliminate ingression of water through the holes and into the panel during a subsequent testing process. Referring to FIG. 1, such a composite acoustic panel 10 may be used in, e.g., an engine nacelle of an aircraft.

Figure 2:
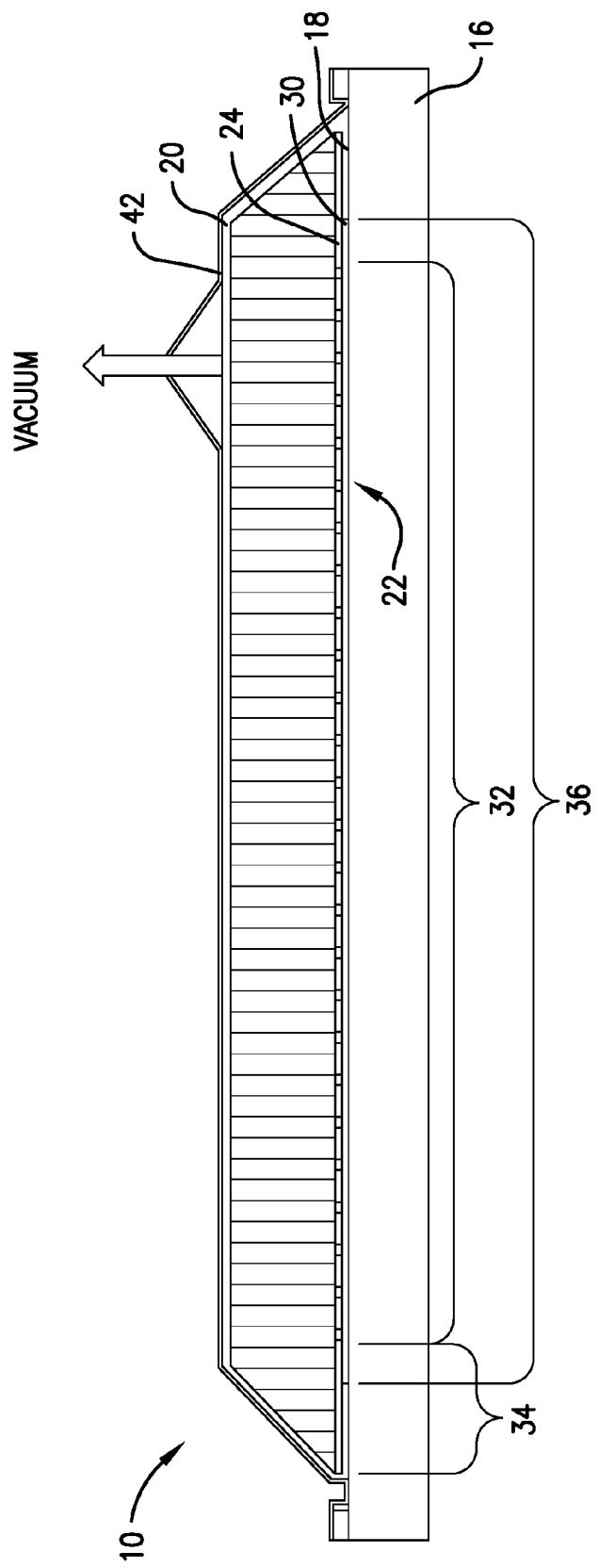
FIG. 2 is a cross-sectional elevation view of the composite acoustic panel of FIG. 1 during a curing process.
Figure 3:
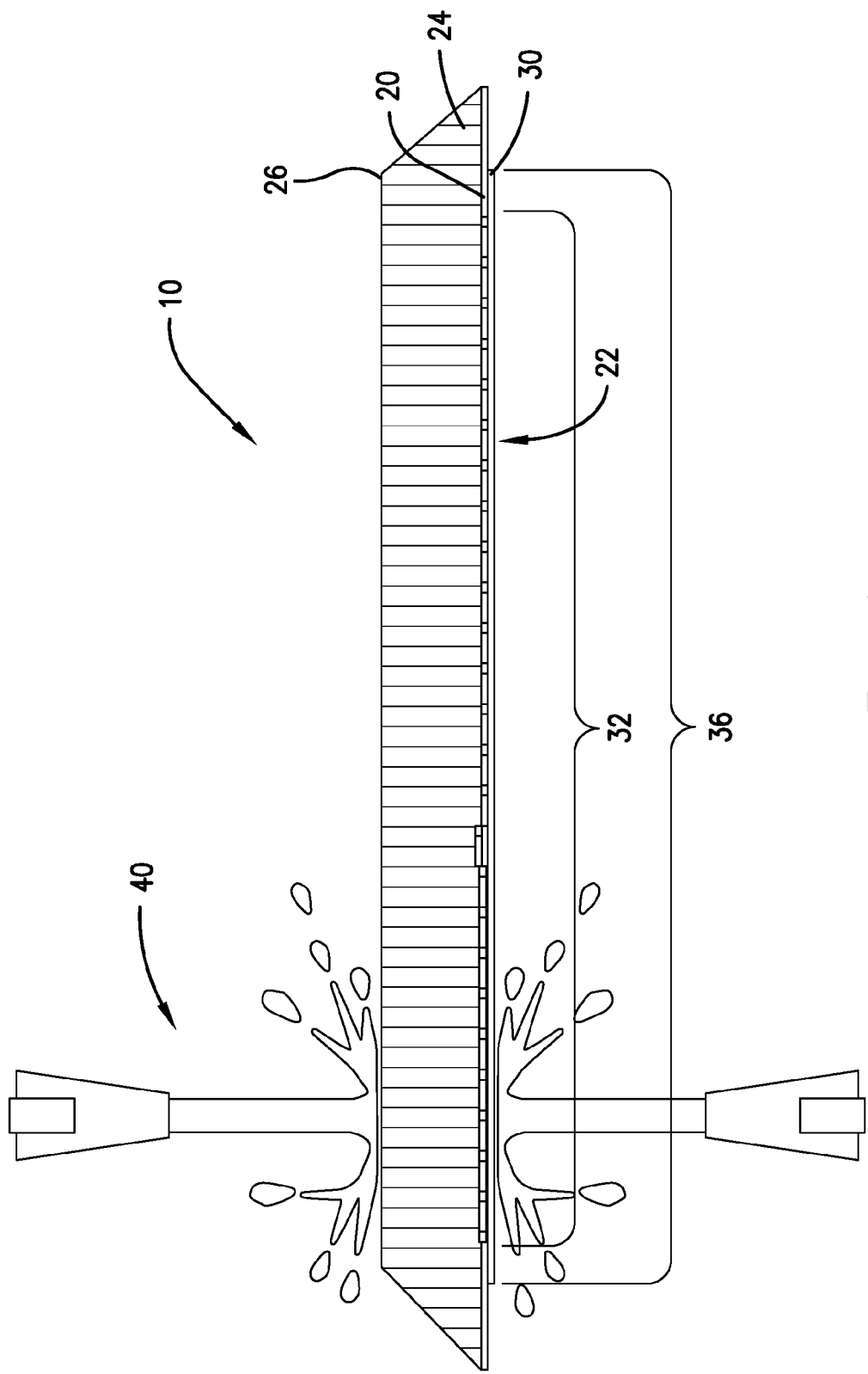
FIG. 3 is a cross-sectional elevation view of the composite acoustic panel of FIG. 1 during a testing process.

Referring also to FIGS. 2 and 3, a lay-up of elements used to form the composite acoustic panel 10 is arranged on a tool 16. The tool 16 may be of any suitable design and construction, and may present any suitable substantially flat or contoured surface, the shape of which may accommodate or be imparted to the composite acoustic panel 10. The tool 16 may be coated with a release agent 18 to facilitate the subsequent removal of the composite acoustic panel 10 from the tool 16. The release agent 18 may be, e.g., a solvent-based silicone solution or oil emulsion that cures or dries on the surface of the tool 16. The lay-up of elements may include a perforated material layer 20 having a plurality of perforations or holes 22 extending through the material 20, a cellular core layer 24 having a plurality of open-ended cells, and a substantially impermeable material layer 26. In various implementations, the lay-up of elements may include multiple cellular core layers or additional inner, intermediate, or outer material layers. For example, if multiple cellular core layers are used, a septum material layer may be interposed between the cellular core layers. All such layers may be made of any suitable material, including composite material (e.g., carbon fiber, glass fiber, and/or aramid fiber and epoxy) and metal (e.g., aluminum). In various implementations some or all of the layers 20,24,26 may be processed prior to being added to the lay-up. For example, the perforated material layer 20 may be partially cured or in a "B-stage" condition when it is added to the lay-up.

A barrier layer 30 may be interposed between the release agent 18 and the perforated material layer 20 so as to temporarily seal the holes 22 in the perforated material layer 20 and thereby reduce or substantially eliminate potential migration of the release agent 18 through the holes 22 and into the composite acoustic panel 10 during curing (as seen in FIG. 2) and also reduce or substantially eliminate ingression of water through the holes 22 and into the composite acoustic panel 10 during subsequent TTU testing (as seen in FIG. 3). The perforated material layer 20 may have a central area 32 which has holes 22 and a surrounding border area 34 which does not have holes. As such, the barrier film 30 may be arranged to cover only the central area 22 and not the border area 34, the entire area, or any area therebetween. In one implementation, the barrier film 30 may be arranged to cover an intermediate area 36 that includes the central area 32 and a portion of the border area 34.

The barrier layer 30 may be a substantially solid film or any suitable material, such as a plastic or nylon film, having a suitably low vapor permeability so as to reduce or prevent any vaporized release agent present (and, in subsequent TTU testing, any water applied) from passing through the holes 22 in the perforated material layer 20. Typically, release agents have relatively high molecular weights, so the barrier film 30 may be substantially impermeable to them. The choice of barrier film material may also take into account the temperature of the curing process. Typically, curing temperatures are approximately between 270 degrees F. and 350 degrees F., but can be lower or higher. In one implementation, the barrier film 30 has the properties of or otherwise acts in the place of the release agent such that the step of applying the release agent to the tool can be eliminated.

The barrier film 30 may have a thickness of approximately between 1 and 3 mills, or approximately 2 mills, and may have a width of at least approximately 12 inches, or approximately between 12 inches and 48 inches, or greater than approximately 48 inches. For some applications, the barrier film 30 may take the form of sheets having widths of approximately 12 feet or more. This is in contrast to pressure sensitive tape which may have a width of approximately between 3 inches and 4 inches.

In one implementation, no adhesive is used between the barrier film 30 and the perforated material layer 20. Furthermore, the barrier film 30 may have little or no inherent adhesive quality, or "tack", so as to facilitate applying it to large panel pieces and otherwise using it in ways that would be difficult or impossible with pressure sensitive tape. However, the barrier film 30 may partially bond to the perforated material layer 20 during the curing process, such as might occur due to correlations in the fluctuating polarizations of nearby particles (i.e., Van der Waals forces) enabled by the close contact promoted by the combination of heat and pressure during the curing process.

The barrier film material may not significantly attenuate an ultrasonic signal during TTU testing (as seen in FIG. 3). Furthermore, any pleats or folds in or overlapping splices of the barrier film 30 may be effectively flattened during the curing process and thereby present a sufficiently smooth surface that is conducive to uniform wetting by a TTU machine 40. Thus, the barrier film 30 may remain on the composite structure during TTU testing and may be removed after TTU testing is complete.

Figure 4:
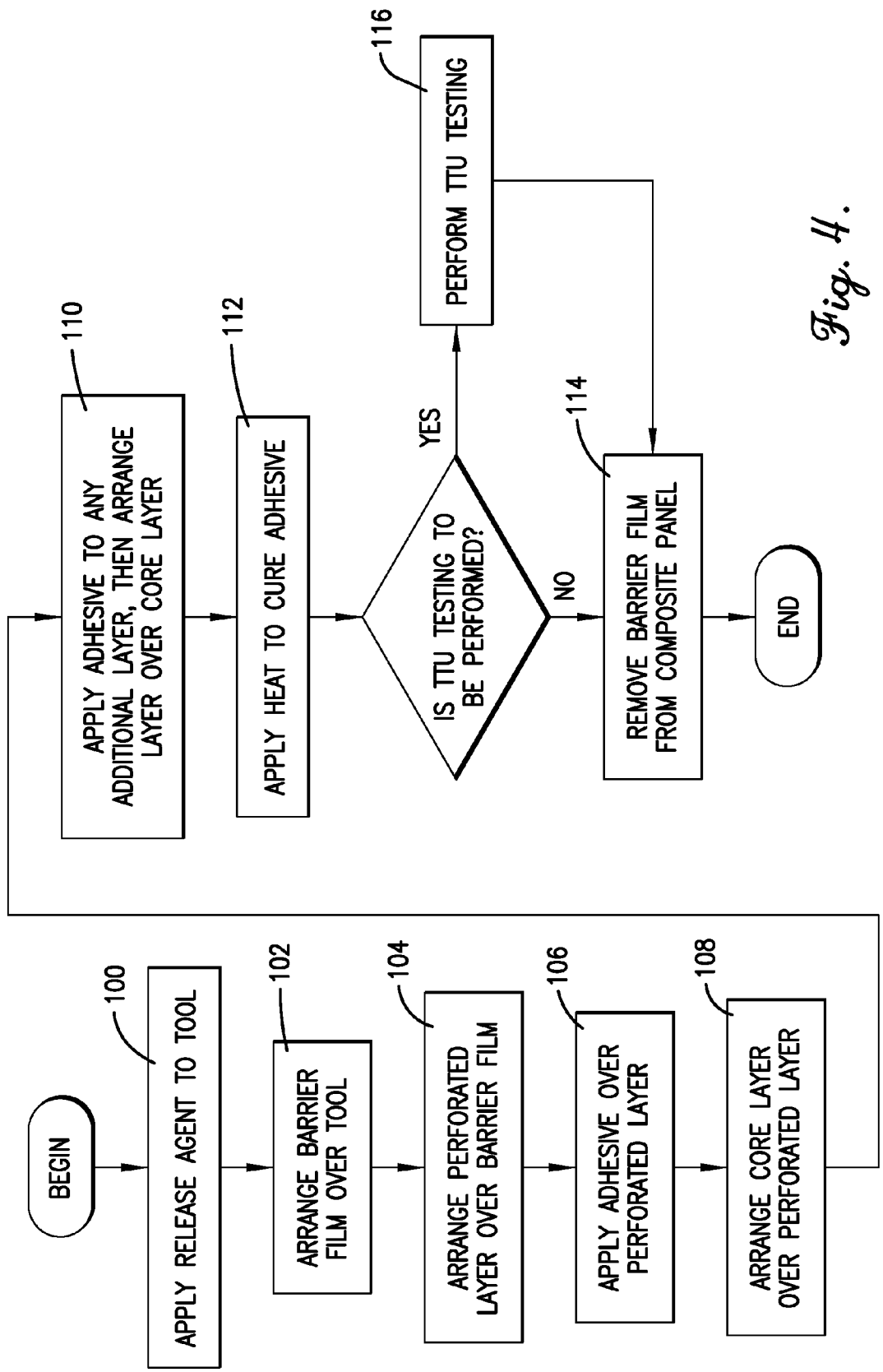
FIG. 4 is a flow diagram of steps in a method of curing and testing the composite acoustic panel of FIG. 1.

In an embodiment of the present invention, the method in which the barrier film is employed may proceed substantially as follows. Referring to FIG. 4, a surface of the tool 16 is coated with the release agent 18, as shown in step 100. The barrier film 30 is arranged over the surface of the tool 16, such that the barrier film 30 will be interposed between the release agent 18 and at least the central area 32 of the perforated material layer 20, as shown in step 102. The perforated material layer 20 is arranged over the barrier film 30, as shown in step 104. An adhesive is applied to one of the perforated material layer 20 or the cellular core layer 24, as shown in step 106. The cellular core layer 24 is arranged over the perforated material layer 20, such that the adhesive is between the perforated material layer 20 and the cellular core layer 24, as shown in step 108. If one or more additional material layers 26 are to be included, adhesive may be applied to one of the cellular core layer 24 or the additional material layer and the additional material layer may be arranged over the cellular core layer 24, such that the adhesive is between the cellular core layer 24 and the additional material layer 26, as shown in step 110. It will be appreciated that the one or more additional material layers 26 may be incorporated into the original lay-up of elements prior to the original curing and/or added to an intermediate composite structure after the original curing and prior to a subsequent curing. Heat (and possibly pressure) is applied to the lay-up of elements to cure the adhesive and bond the various layers into the single composite acoustic panel 10, as shown in step 112. In one implementation, a vacuum bag 42 may be arranged over the lay-up of elements so that vacuum may be used to compress the lay-up of elements during the curing process. As discussed, the barrier film 30 interposed between the release agent 18 and the perforated material layer 20 reduces or prevents the migration of any vaporized release agent from migrating through the holes 22 and into the composite acoustic panel 10. If TTU testing will not be performed on the completed composite acoustic panel 10, the panel 10 may be removed from the tool 16 and the barrier film 30 may be peeled away from the panel 10, as shown in step 114. If TTU testing will be performed on the completed composite acoustic panel 10, the panel 10 may be removed from the tool 16, the TTU testing may be performed with the barrier film 30 on the panel 10, and then the barrier film 30 may be peeled away from the panel 10, as shown in step 116. As discussed, the barrier film 30 interposed between the water column of the TTU device 40 and the perforated material layer 20 reduces or prevents the ingression of water through the holes 22 and into the composite acoustic panel 10.

Thus, the present invention provides advantages over the prior art, including that it provides a system and method for temporarily sealing the holes 22 in the perforated material layer 20 of the composite acoustic panel 10 so as to reduce or substantially eliminate potential migration of the release agent 18 through the holes 22 and into the panel 10 during the curing process and so as to reduce or substantially eliminate ingression of water through the holes 22 and into the panel 10 during the subsequent TTU testing process.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A method of forming a composite structure on a tool having a surface and then testing the composite structure, the method comprising the steps of:
   (1) arranging a barrier layer over the surface of the tool;
   creating a lay-up of elements by—
   (2) arranging a perforated material layer over the barrier layer, wherein the perforated material layer presents a plurality of holes and the barrier layer does not extend through the plurality of holes,
   (3) applying an adhesive to at least one of the perforated material layer or a cellular core layer, and
   (4) arranging the cellular core material layer over the perforated material layer such that the adhesive is interposed between the perforated layer and the cellular core layer;
   (5) heating the lay-up of elements to cure the adhesive and form the composite structure;
   (6) removing the composite structure from the tool;
   (7) performing a test on the composite structure; and
   (8) removing the barrier layer after the test of the composite structure is complete.

2. The method as set forth in claim 1, wherein the barrier layer is applied as a substantially solid film.

3. The method as set forth in claim 2, wherein the barrier layer is a nylon film.

4. The method as set forth in claim 2, wherein the substantially solid film has a width of at least approximately 12 inches.

5. The method as set forth in claim 1, wherein the perforated material layer of step (2) is partially cured.

6. The method as set forth in claim 1, wherein in step (2) no adhesive is used between the barrier layer and the perforated material layer.

7. The method as set forth in claim 1, further including the step of applying a release agent to the surface of the tool prior to step (1).

8. The method as set forth in claim 7, wherein the barrier layer has a low vapor permeability with regard to the release agent.

9. The method as set forth in claim 1, further including the steps of—
   applying the adhesive to at least one of the cellular core material or a third material layer; and
   arranging the third material layer over the cellular core material layer such that the adhesive is interposed between the third material layer and the cellular core material layer.

10. The method as set forth in claim 1, wherein the test of step (7) is a through transmission ultrasonic test in which water is prevented by the barrier layer from entering the plurality of holes.

11. The method as set forth in claim 1, further including the steps of—
   arranging a vacuum bag over the lay-up of elements; and
   applying a vacuum to the vacuum bag during step (5) so as to compress the lay-up of elements.

12. A method of forming a composite acoustic panel on a tool having a surface and then testing the composite acoustic panel, the method comprising the steps of:
   (1) arranging a barrier layer over the surface of the tool, wherein the barrier layer acts as a release agent;
   creating a lay-up of elements by—
   (2) arranging a perforated material layer over the barrier layer, wherein the perforated material layer presents a plurality of holes and the barrier layer does not extend through the plurality of holes,
   (3) applying an adhesive to at least one of the perforated material layer or a cellular core layer, and
   (4) arranging the cellular core material layer over the perforated material layer such that the adhesive is interposed between the perforated layer and the cellular core layer;

(5) heating the lay-up of elements to cure the adhesive and form the composite acoustic panel;
(6) removing the composite acoustic panel from the tool;
(7) performing a through transmission ultrasonic test on the composite acoustic panel in which water is prevented by the barrier layer from entering the plurality of holes; and
(8) removing the barrier layer after the through transmission ultrasonic test of the composite acoustic panel is complete.

13. The method as set forth in claim 12, wherein the barrier layer is applied as a substantially solid film.

14. The method as set forth in claim 13, wherein the barrier layer is a nylon film.

15. The method as set forth in claim 13, wherein the substantially solid film has a width of at least approximately 12 inches.

16. The method as set forth in claim 13, wherein the perforated material layer of step (2) is partially cured.

17. The method as set forth in claim 12, wherein in step (2) no adhesive is used between the barrier layer and the perforated material layer.

18. The method as set forth in claim 12, further including the steps of—
applying the adhesive to at least one of the cellular core material or a third material layer; and
arranging the third material layer over the cellular core material layer such that the adhesive is interposed between the third material layer and the cellular core material layer.

19. The method as set forth in claim 12, further including the steps of—
arranging a vacuum bag over the lay-up of elements; and
applying a vacuum to the vacuum bag during step (5) so as to compress the lay-up of elements.

20. A method of forming a composite acoustic panel on a tool having a surface and then testing the composite acoustic panel, wherein the composite acoustic panel is operable to attenuate noise, the method comprising the steps of:
(1) applying a release agent to the surface of the tool;
(2) arranging a barrier layer over the release agent, wherein the barrier layer is a substantially solid film; creating a lay-up of elements by—
(3) arranging a perforated material layer over the barrier layer, wherein the perforated material layer presents a plurality of holes and the barrier layer does not extend through the plurality of holes,
(4) applying an adhesive to at least one of the perforated material layer or a cellular core layer,
(5) arranging the cellular core material layer over the perforated material layer such that the adhesive is interposed between the perforated layer and the cellular core layer,
(6) applying the adhesive to at least one of the cellular core material or a third material layer, and
(7) arranging the third material layer over the cellular core material layer such that the adhesive is interposed between the third material layer and the cellular core material layer;
(8) heating the lay-up of elements to cure the adhesive and form the composite acoustic panel;
(9) removing the composite acoustic panel from the tool;
(10) performing a through transmission ultrasonic test on the composite acoustic panel in which water is prevented by the barrier layer from entering the plurality of holes; and
(11) removing the barrier layer after the through transmission ultrasonic test of the composite acoustic panel is complete.

* * * * *